(No Model.)
A. C. WHITE.
TRANSMITTER CIRCUIT.
No. 447,220. Patented Feb. 24, 1891.
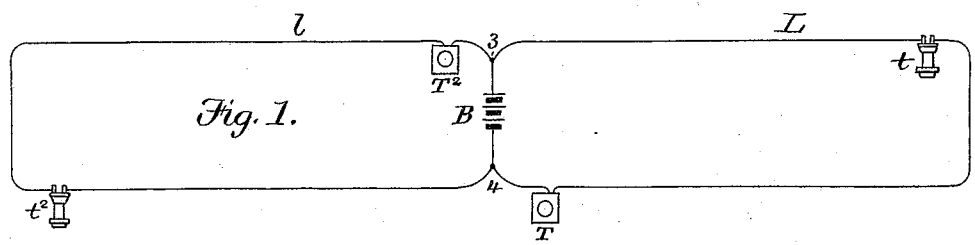
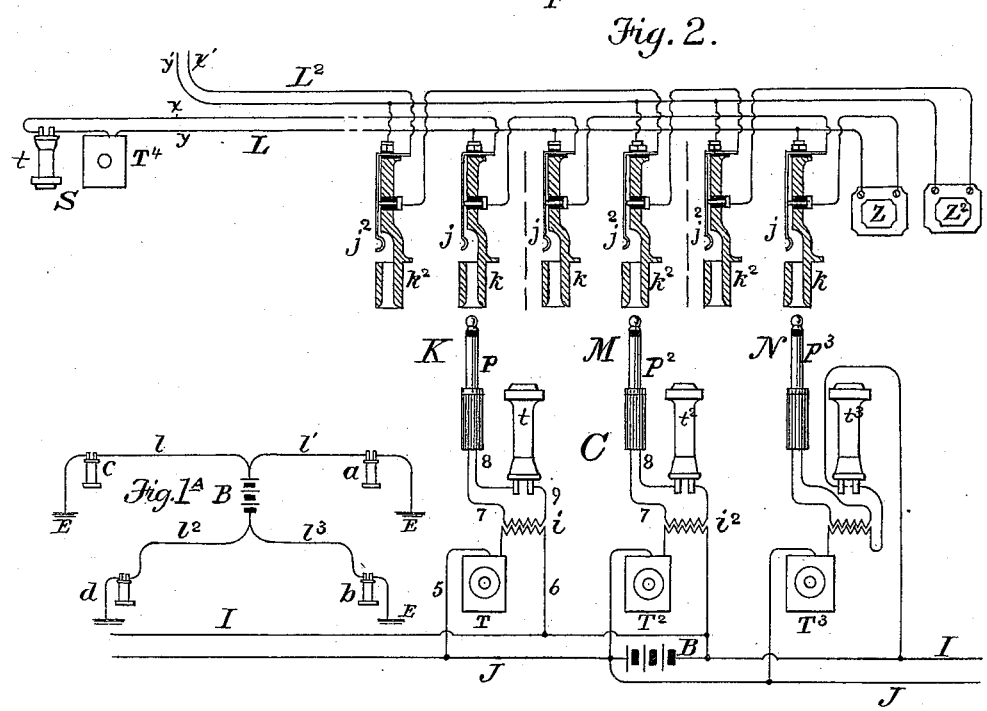
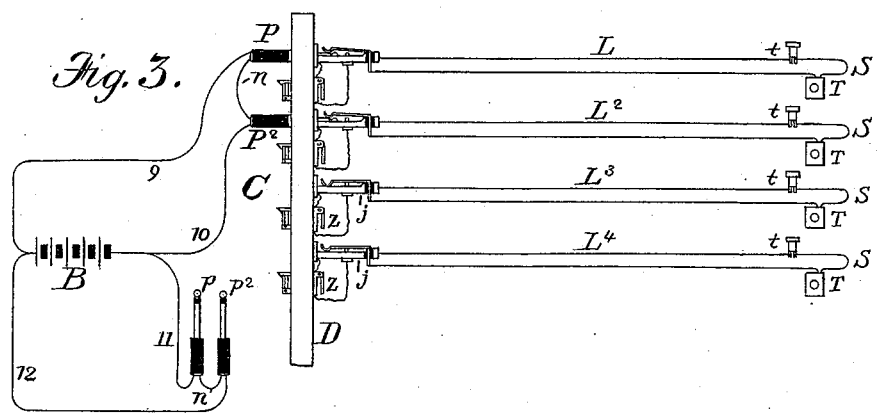
Witnesses.
Gramille Pierce
V. M. Berthold
Inventor.
Anthony C. White

UNITED STATES PATENT OFFICE.

ANTHONY C. WHITE, OF BOSTON, MASSACHUSETTS, ASSIGNOR TO THE AMERICAN BELL TELEPHONE COMPANY, OF SAME PLACE.

TRANSMITTER-CIRCUIT.

SPECIFICATION forming part of Letters Patent No. 447,220, dated February 24, 1891.

Application filed July 24, 1890. Serial No. 359,765. (No model.)

*To all whom it may concern:*

Be it known that I, ANTHONY C. WHITE, residing at Boston, in the county of Suffolk and State of Massachusetts, have invented certain Improvements in Transmitter-Circuits, of which the following is a specification.

This invention relates to the electrical transmission of speech, and more particularly to the common use by a number of independent current-varying transmitting-instruments, each in its own independent circuit, of a single battery, which may be located in any convenient place. It is not broadly new, of course, to place battery-transmitters in a main circuit together with an exciting-battery, dispensing with the ordinary intervention of an induction-coil, or to locate a battery at a central station to supply a number of outlying transmitting-instruments through the intermediation of a special battery supply-circuit and of local induction-coils. Nor is it broadly new to arrange a series of telephone-circuits all in connection at a central station with a common exciting-battery, as in Letters Patent granted to Chichester A. Bell August 3, 1886, No. 346,708.

The object of my invention is to a great extent identical with that of previous inventions of this class, being in substance to provide that the battery may be in one convenient place where it can at all times receive close supervision and necessary attention, and to effect a very material reduction in the number of cells of battery required for a given number of transmitters. In such systems as have heretofore had these aims in view when induction-coils have been employed the primaries of these coils have usually been connected serially with a common supply-circuit, and when these have been dispensed with the circuits, as in the patent of Bell, to which reference has been made, have been connected as multiple-arc earth branches of the same battery, in which case special devices have been required to maintain the necessary independence and individuality of the several circuits. If the latter plan be adopted, it is obvious that whenever two circuits were united in an exchange for conversation the battery would be in a third branch, which in practice would be a serious objection were the two united circuits of unequal length. On the other hand it is clearly out of the question to connect a plurality of pairs to earth-completed circuits with the battery actually in direct circuit between them, for, suppose a single battery to be included between a single pair of circuits, one of these extending from its positive pole to earth and the other from its negative pole to earth, it is obvious that communication can readily be maintained between the stations at the two earth terminals; but if we now connect another pair of circuits to the positive and negative poles, respectively, of the same battery we can no longer maintain individuality, for when either one of the stations on either side of the battery is transmitting it is evident that the two lines on the other side of the battery are equally in circuit with the said transmitting-line, and the receiving-telephones of both are alike responsive. My invention, however, meets the conditions of independence when a plurality of united circuits have their variable-resistance transmitters energized from a common battery, and it does this by providing that all of the said circuits shall be metallic circuits and that whether the said circuits be simple or compound each shall constitute a continuously metallic shunt for all of the others, and shall in turn be shunted by the said others, the battery itself being a portion of each and all of the circuits.

My invention does not necessarily involve the disuse of induction-coils; but it does imply that whether the transmitter-circuits include the primary helix of an induction-coil or whether they be main lines they must be metallic circuits, and the two ends of each of said metallic circuits must respectively be connected with the two poles of the battery, which battery must be of as low resistance as possible.

In the drawings which accompany this specification, Figure 1 is a diagram illustrating the principle of the invention. Fig. 1$^A$ is a diagram illustrating the impossibility of independently operating earth-completed circuits on this principle. Fig. 2 shows my invention applied to a number of operator's telephones all in the same central station. Fig. 3 illustrates its operation in connection with the main-line circuits of a telephone-exchange.

Referring first to Fig. 1, L and $l$ are respectively metallic telephone-circuits both connecting with the same battery B, the current from which is variable in either circuit by the transmitter of said circuit. The circuit L has a current-varying transmitting-instrument T and a receiving-instrument $t$, while the circuit $l$ in like manner has a transmitter $T^2$ and a receiver $t^2$.

Words uttered near transmitter T will be reproduced in receiver $t$, while receiver $t^2$ will be irresponsive, and in the same way the operation of $T^2$ will affect $t^2$, but will not operate $t$. It may readily be understood why this should be so when it is considered that, though the battery B is common to both circuits, the instruments of either circuit are not in circuit with each other through the said battery. If, for example, I fix my attention on transmitter $T^2$ of circuit $l$ and attempt to trace its circuit through circuit L, I find that after passing the junction-point 3, over the line L, and continuing successively through the receiver $t$ and transmitter T, if reaching the point 4 I attempt to complete the circuit through the battery, I have simply arrived at the same terminal of the transmitter $T^2$ which I started from, while if after reaching the point 4 I attempt to continue the circuit by way of line $l$ through receiver $t^2$ I have not included the battery at all, showing that with a battery of sufficiently low resistance one battery can be used in common by a number of independent transmitters in a like number of independent circuits.

In Fig. 1$^a$ four earth-completed circuits $l$ $l'$ $l^2$ $l^3$ are shown, $l$ and $l'$ being connected on one side and $l^2$ and $l^3$ on the other side of a battery B. Each is furnished with a telephone at its terminal station, the several lines all terminating in earth plates or terminals E; but in this case if any one of the station-instruments be operated both of those connected with the other side of the battery will become responsive. If, for example, words be transmitted at $c$, $a$ and $b$ will both reproduce the said words, or if $a$ should transmit, $c$ and $d$ will both act as receivers, because the battery B is between $a$ and $d$ and in circuit to as full an extent as it is between $a$ and $c$, and this whether $l'$ and $l^2$ or $l$ and $l^3$ be intended to be continuous circuits, or whether the several circuits on one side are intended to be connected up for exchange-work with an equal number of circuits on the other side. Thus if $l$ desires to converse privately with $l^2$ he can only do so as long as $l^2$ alone is connected with him on the other side of the battery. As soon as $l^3$ also is united to the same side of the battery as $l^2$ it also receives the message of $l$. In other words, it is impossible, if a plurality of earth-completed circuits be connected with the two poles of a battery, to determine for any one of them which one on the other side of the battery he is selectively connected with. Therefore the common use of a battery which I achieve in connection with metallic circuits is not in the same way possible if earth-completed circuits are employed.

One way of utilizing my invention is shown in Fig. 2, which indicates diagrammatically a portion of the central station of a telephone-exchange in which there are a number of switch-board sections each supervised by its own operator. The several operator's telephones may by my invention, all without reciprocal interference, be energized by a single battery.

L $L^2$ are subscribers' lines, entering from subscribers' stations S. These are shown as being metallic circuits, and having each two line-wires $x$ and $y$. The circuit L leads from the sub-station S by wire $x$ to the central station C, and then through its spring-jack connections $j$ on the sections of mutiple switch-board K, M, and N successively, and then reaches its call-annunciator $z$, whence it returns to the sub-station S (where are telephones as usual) by wire $y$, which branches to the frame of the respective spring-jacks of its circuit. In the same way circuit $L^2$ is led through its spring-jacks $j^2$ and annunciator $z^2$.

The operator at each section and for as many sections as may in practice be in use is provided with the regular outfit of call sending, testing, and supervising appliances, which, however, with the exception of the latter, it is not necessary to show here. I show, however, the supervising-telephones of three sections, and will now describe the same. B is the common transmitter-battery from which proceeds main wires I and J. I prefer a battery of low resistance, and have in practice found a secondary or storage battery to answer the purpose well. At each section of switch-board a loop-circuit extending from one of the battery-mains through the transmitter T and through the primary helix of an induction-coil $i$ to the other battery-main is provided, the said loop being composed of the wires 5 and 6 and the above-recited appliances. The other helix of the induction-coil $i'$ connects by means of the wires 7 8 9 with a double connection-plug P, which, when inserted in a spring-jack, places the operator's telephones in connection with the line represented by said spring-jack. The operator's receiving-telephone $t$ may be, as shown, either in circuit with the double plug P and the secondary helix of the coil $i'$, or, if desired, it may, properly wound for that purpose, be included, together with the transmitter T, in the battery-loop.

Fig. 3 shows how a battery may be caused to successfully supply in common the transmitters of a number of main telephone-lines. L, $L^2$, $L^3$, and $L^4$ represent a group of telephone metallic circuits, each extending from a sub-station S to a central station C, and all connected there normally with annunciators for incoming call-signals, and at all times with a switchboard D, whereby they may be interconnected in pairs for conversation. The circuits L and L² are shown as being so interconnected by means of the double conductor mated plugs P and P², controlling the wires 9 and 10, leading respectively from the two poles of the battery B, and united to each other by the link-wire n. It is evident that a compound talking-circuit is thus formed from sub-station S of line L to the sub-station of line L², and through the instruments of both of the said sub-stations, and the battery B, and, furthermore, that the circuits L³ and L⁴, and in fact a large number of other similar pairs, could in the same way also be united by the plugs p p², or other such pairs of plugs, and that by means of the wires 11 and 12 and the link-wire, or other similar battery-wires, the battery B is caused to form a part of other compound talking-circuits; but that, although the said battery is thereby caused to form a part of a plurality of such circuits, the instruments of one circuit do not electrically connect with the instruments of another circuit through said battery. It may be stated with respect to the organization shown in Fig. 2 that since the transmitters are in metallic circuits and the main lines connected by induction only with said transmitter it is not essential that the said main lines also shall be metallic circuits. A large number of circuits or of pairs of circuits may in the same way be associated with a single battery, although for clearness of representation I have in the drawings indicated but few. Moreover, though in the diagram Fig. 1, I have shown but one transmitter and one receiver in each circuit, in practice, as is well understood, it is usual to provide a receiver and transmitter at both ends of the line and the two transmitters would be energized by the same battery.

I claim as my invention—

1. In a telephone system, the combination of a plurality of independent metallic circuits, a transmitter and a receiver in each circuit, and a transmitter-energizing battery common to all said circuits, the circuits being adapted for connection at one end to one pole of said battery and at the other to one end of any of the other circuits of the system, so as to form therewith a continuous circuit through the instruments of both circuits and through said battery, substantially as described.

2. In a telephone system, the combination of a series of independent metallic circuits extending from a central station and including each a transmitter and a receiver, an energizing-battery at the central station common to all of said circuits, and means, as indicated, for connecting said circuits in pairs, thereby constituting any desired number of compound circuits, each including a pair of connected stations and the common battery, and each independent of the others, substantially as described.

3. In a telephone-exchange system, a series of metallic telephone-circuits extending from sub-stations to a central station and each including telephone transmitting and receiving instruments, double conductor-connections for uniting the said metallic circuits in pairs at the said central station for intercommunication, and a low-resistance battery located at the central station, included in and forming a part of each of the circuits of the said double-conductor connections, whereby the said battery may be used in common by the said metallic circuits without interference to energize the transmitters thereof, substantially as described.

4. Two or more independent metallic circuits, each including a pair of stations connected at a central station for conversation, and each station having a transmitter and a receiver, in combination with a battery at said central station for energizing the transmitters of all the circuits, said battery forming a common conducting-section of the several circuits, substantially as described.

5. In a telephone system, a battery at a central station, main conductors extending from the poles thereof, respectively, a number of loops therefor in parallel circuit of the said battery with each other, each extending from one of the said main conductors to the other, and including a variable-resistance transmitter and one helix of an induction-coil, and constituting, together with said battery and main conductors, a metallic telephone-circuit, a series of main-line circuits extending to different stations, an independent telephone-circuit connection in circuit with the remaining helix of each of the said induction-coils for including the same at will in any of said main-line circuits, substantially as described.

In testimony whereof I have signed my name to this specification, in the presence of two subscribing witnesses, this 23d day of July, 1890.

ANTHONY C. WHITE.

Witnesses:
GEO. WILLIS PIERCE,
V. M. BERTHOLD.